US007947109B2

(12) United States Patent
Sayers et al.

(10) Patent No.: US 7,947,109 B2
(45) Date of Patent: May 24, 2011

(54) POWERED AIR PURIFYING RESPIRATOR WITH BATTERY PASSIVATION SENSING/CORRECTION AND METHOD THEREFOR

(75) Inventors: T. Mick Sayers, Thornley (GB); Desmond T. Curran, Durham (GB)

(73) Assignee: 3M Innovative Properties Company, St. Paul, MN (US)

( * ) Notice: Subject to any disclaimer, the term of this patent is extended or adjusted under 35 U.S.C. 154(b) by 846 days.

(21) Appl. No.: 11/244,578

(22) Filed: Oct. 6, 2005

(65) Prior Publication Data

US 2007/0079701 A1 Apr. 12, 2007

(51) Int. Cl.
*B01D 46/46* (2006.01)

(52) U.S. Cl. ........... 95/1; 95/23; 95/26; 96/110; 96/417; 96/422; 55/467; 128/200.24

(58) Field of Classification Search .................. 95/1, 26, 95/23; 96/417, 110, 422; 55/DIG. 34, 467, 55/DIG. 35; 128/200.24
See application file for complete search history.

(56) References Cited

U.S. PATENT DOCUMENTS

| | | | | |
|---|---|---|---|---|
| 4,839,249 | A | 6/1989 | Magnussen, Jr. et al. | |
| 4,899,740 | A * | 2/1990 | Napolitano | 128/202.22 |
| 5,659,296 | A * | 8/1997 | Debe et al. | 340/632 |
| 5,666,949 | A | 9/1997 | Debe et al. | |
| 5,869,970 | A | 2/1999 | Palm et al. | |
| 5,950,621 | A * | 9/1999 | Klockseth et al. | 128/204.26 |
| 5,959,371 | A | 9/1999 | Dooley et al. | |
| 6,403,256 | B1 | 6/2002 | Gan et al. | |
| 6,426,628 | B1 | 7/2002 | Palm et al. | |
| 6,615,828 | B1 * | 9/2003 | Petherbridge | 128/200.28 |
| 6,666,209 | B2 * | 12/2003 | Bennett et al. | 128/200.24 |
| 6,780,542 | B2 | 8/2004 | Spillman et al. | |
| 6,796,304 | B2 * | 9/2004 | Odell et al. | 128/201.29 |
| 6,815,930 | B2 * | 11/2004 | Goodman | 320/134 |
| 6,826,427 | B1 | 11/2004 | Fayram et al. | |
| 6,837,239 | B2 * | 1/2005 | Beizndtsson et al. | 128/201.25 |
| 6,886,563 | B2 | 5/2005 | Bostock et al. | |
| 6,895,960 | B2 | 5/2005 | Fabin | |
| 7,380,551 | B2 * | 6/2008 | Alvey | 128/201.25 |
| 2003/0049524 | A1 * | 3/2003 | Spillman et al. | 429/101 |
| 2003/0088378 | A1 | 5/2003 | Freitag | |
| 2004/0051504 | A1 * | 3/2004 | Syracuse et al. | 320/127 |
| 2005/0007504 | A1 | 1/2005 | Fergason | |

(Continued)

FOREIGN PATENT DOCUMENTS

EP 0164942 A2 12/1985

(Continued)

OTHER PUBLICATIONS

"Li Cell Passivation", 5 pgs.

*Primary Examiner* — Duane Smith
*Assistant Examiner* — Ives Wu
(74) *Attorney, Agent, or Firm* — Emily M. Van Vliet

(57) ABSTRACT

A powered air purifying respirator and method for directing a forced flow of air to a wearer. A battery operatively powers a fan fluidly coupled with the air flow path which exhibits, in some circumstances, a passivation. A voltage delay sensing circuit, operatively coupled to the battery, provides an indication related to the passivation. A signal may provide an indication to a user of the passivation of the power source. A correction circuit may correct such passivation.

27 Claims, 5 Drawing Sheets

U.S. PATENT DOCUMENTS

2005/0022817 A1 2/2005 Alvey

FOREIGN PATENT DOCUMENTS

| | | | |
|---|---|---|---|
| EP | 0164946 | A2 | 12/1985 |
| JP | 2004-525682 | | 8/2004 |
| WO | WO 96/12523 | | 5/1996 |
| WO | WO 96/12523 | A1 | 5/1996 |
| WO | WO 96/12524 | | 5/1996 |
| WO | WO 96/12524 | A1 | 5/1996 |
| WO | WO 96/29116 | | 9/1996 |

* cited by examiner

POWERED AIR PURIFYING RESPIRATOR WITH BATTERY PASSIVATION SENSING/CORRECTION AND METHOD THEREFOR

The present invention relates to powered air purifying respirators and methods to overcome issues associated with voltage delay and/or battery passivation.

BACKGROUND

The use of battery powered air purifying respirators (PAPR) is well established technology. A PAPR typically includes a forced flow of air to a wearer, a filter, and an electric power supply, commonly a battery, to power the forced air supply, e.g., from a blower or a fan.

Differing types of electrical power supplies, typically batteries, can be used in a PAPR. Examples include a single use disposable battery, a rechargeable battery and an intrinsically safe battery. An intrinsically safe battery is designed to limit the amount of stored electrical energy discharge from such devices which may be hazardous in some environments, e.g., an explosive environment.

Some PAPRs use two types of batteries, e.g., a non-rechargeable battery known as a primary battery and a rechargeable battery known as a secondary battery. Such PAPRs can be used in explosive and non-explosive environments depending on the requirements to be intrinsically safe or not.

Lithium batteries can be used as a power source for PAPRs. Lithium primary batteries provide an advantage due to their intrinsically long shelf life. The long shelf life of lithium primary batteries is due to a battery cell property known as passivation. Passivation is the term used to describe a build up, over time, of a resistance layer in the battery cell. The resistance layer tends to prevent internal discharge of the battery which tends to extend its shelf life. The effect of storage time may have a severe impact on the ability to overcome the resistance effects of this layer by limiting the initial available electrical energy and progressively increases during storage.

A disadvantage of lithium batteries, such as used as primary batteries, exhibiting cell passivation is observed by a drop in initial available voltage, typically called a voltage delay, following the start of use of the battery after a significant period of non-use. The drop in available voltage due to the passivation process having occurred.

When a lithium primary battery is utilized, the resistance layer is gradually depassivated, i.e., “broken down”, and the battery then functions normally, i.e., producing the expected voltage available from the battery. However, until the resistance layer is “broken down”, or depassivated, a lower voltage may be available from the battery than would otherwise be the case.

The effect on the initial electrical energy available caused by cell passivation is also known as a voltage delay. That is, the initial voltage that is available from the battery is reduced, perhaps severely reduced, as the required load to the PAPR is applied. Only after a period of time, during which the process of depassivation is completed, does the expected initial cell voltage return following the removal of the passivation layer.

Such a lower initial voltage may have an adverse effect on the performance of the PAPR being powered by the lithium battery, e.g., a lower volume of air may be available to be purified, and, perhaps, even on the electronic control circuitry of the PAPR. It is possible that such a lower voltage may limit or may prevent operation of the respirator altogether.

This problem can be exacerbated with PAPRs using intrinsically safe power supplies which already limit the current draw available from the power supply in order to safeguard operation in hazardous, e.g., explosive, environments as discussed above, which may increase the time for depassivation.

SUMMARY OF THE INVENTION

The user of a PAPR using a lithium battery, or another power source exhibiting a similar passivation, may not be aware of the limited amount of voltage available from the power source and, hence, the limited performance of the PAPR. Such a user could possibly take a PAPR with such a power source exhibiting passivation into an operating environment requiring full operation of the PAPR. If full operating characteristics of the PAPR are not then available, unfortunate consequences could result.

Thus, in an embodiment, it is important that the user of a PAPR be assured that the air respirator will function as intended in spite of the use of a power supply exhibiting passivation and/or that the user of the PAPR be notified and/or warned of the passivation and/or the elimination or correction of the passivation so that the user may take the necessary steps to deal with the performance of the PAPR such as by not using the PAPR in a critical environment unless and/or until such passivation has been mitigated.

In an embodiment, the present invention provides a PAPR capable of directing a forced flow of air through a filter to a wearer. A battery operatively powers a fan fluidly coupled with the air flow path which exhibits, in some circumstances, passivation. A correction circuit is arranged to correct the passivation of the battery.

In another embodiment, the present invention provides a method of operating a PAPR capable of directing a forced flow of air to a wearer having a member having an air flow path for the forced flow of air, a filter, a fan, fluidly coupled with the air flow path, creating the forced flow of air; and a battery, operatively powering the fan, exhibiting, in some circumstances, passivation. The passivation of the battery is sensed. An indication of the passivation of the battery is provided to a user.

In another embodiment, the present invention provides a method of operating a PAPR capable of directing a forced flow of air to a wearer having a member having an air flow path for the forced flow of air, a filter, a fan, fluidly coupled with the air flow path, creating the forced flow of air; and a battery, operatively powering the fan, exhibiting, in some circumstances, passivation. The passivation of the battery is sensed. Passivation of the battery is corrected responsive to said indication.

DETAILED DESCRIPTION

As used in this description, the following terms have the meanings indicated:

"Correction circuit" is any circuitry, software program or function provided to provide to processes described in this specification below for overcoming the effects of passivation of a battery;

"Fan" is a mechanism for providing a forced flow of air, generally an electrically powered mechanical mechanism for creating or adding pressure and/or flow to a fluid;

"Forced flow of air" is a supply of air available to a user of the PAPR, generally powered by a fan, motor or other suitable propellant;

"Indication related to passivation" is any provision indicative of a sensing of or detection of passivation, or a degree of passivation, of a battery, such as, but not limited to, by an analog or digital electrical signal, including any sort of voltage, waveform, current and/or timing;

"Member having an air flow path" is any mechanism for delivering a supply of air to a user of the PAPR such as, but not limited to, a duct, tube, hood, body suit;

"Overcoming passivation" means taking a step or steps or performing a function to ameliorate the effects of passivation of a battery, such as by, but not limited to, limiting current draw in order to preserve voltage from the battery;

"PAPR" is a personal air purifying respirator;

"Providing an indication to a user" is any means described below in this specification for alerting a user by visual, aural or other means; and "User" is a person, who could be the wearer, but not necessarily the wearer, alerted by a signal related to the PAPR; and "Wearer" is a person, or one of multiple persons, for whom the forced flow of air is provided by the PAPR.

Figure 1:
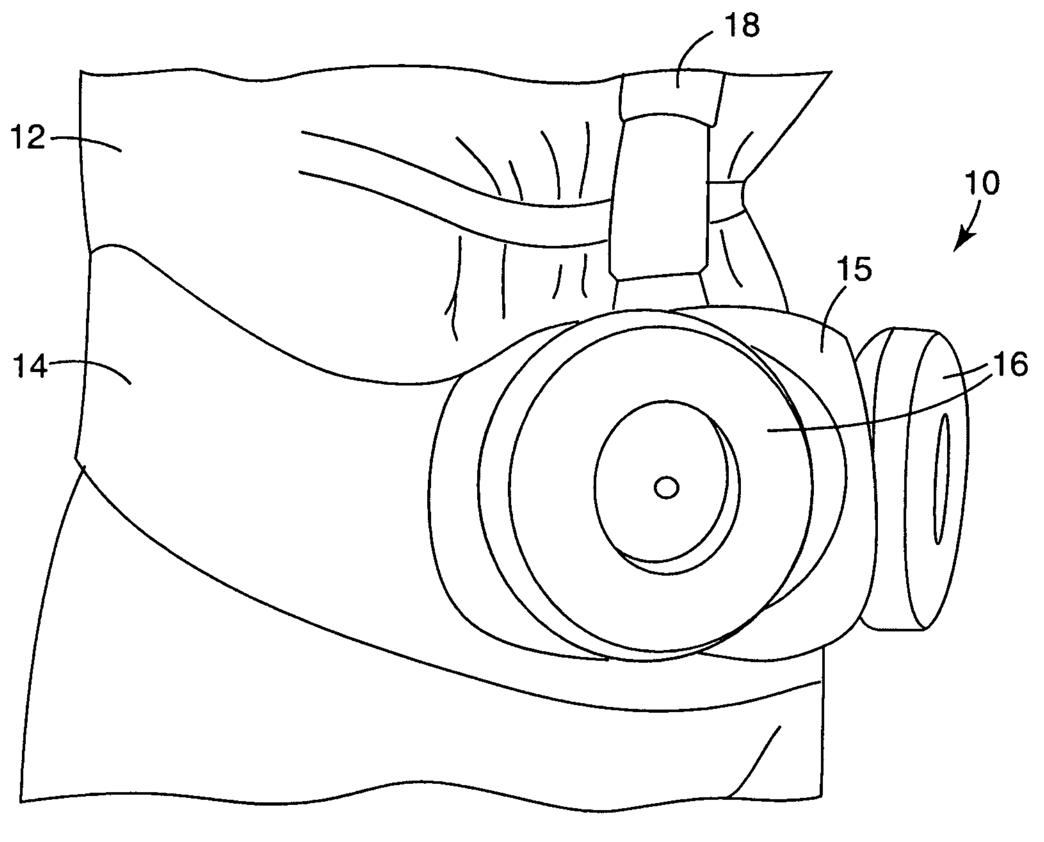
FIG. 1 is an external view of a PAPR constructed in accordance with an embodiment of the present invention.

FIG. 1 depicts an exterior view of a PAPR 10 constructed in accordance with an embodiment of the present invention. PAPR 10 is attached around the waist of a wearer 12 with belt 14. PAPR 10 conventionally contains a housing 15 having a filter or filters 16. Housing 15 contains a fan or blower for producing a forced air flow. A supply of electrical power, typically a battery, powers the fan or blower and may be located within housing 15 or elsewhere, e.g., unattached or attached to wearer 12 via separate pack such as a back pack. Air duct 18 facilitates the transport of forced air flow from housing 15 of PAPR 10 for use by wearer 12, typically accomplished through a mouth or nose piece or a head piece (not shown). PAPR 10 is essentially self-contained and provides wearer 12 with a supply of filtered air utilizing filters 16, fan or blower and air duct 18.

PAPR 10 may be stored in an accessible location ready to be utilized by a user should the need for use arise. If a user were to encounter an environment desiring or requiring the forced supply filtered air, the user could select PAPR 10 from storage, put on PAPR 10 and use PAPR 10 in the desired environment. Typical environments in which a PAPR may be used include grinding, welding, paint spraying, foundry, agriculture and emergency response.

Figure 2:
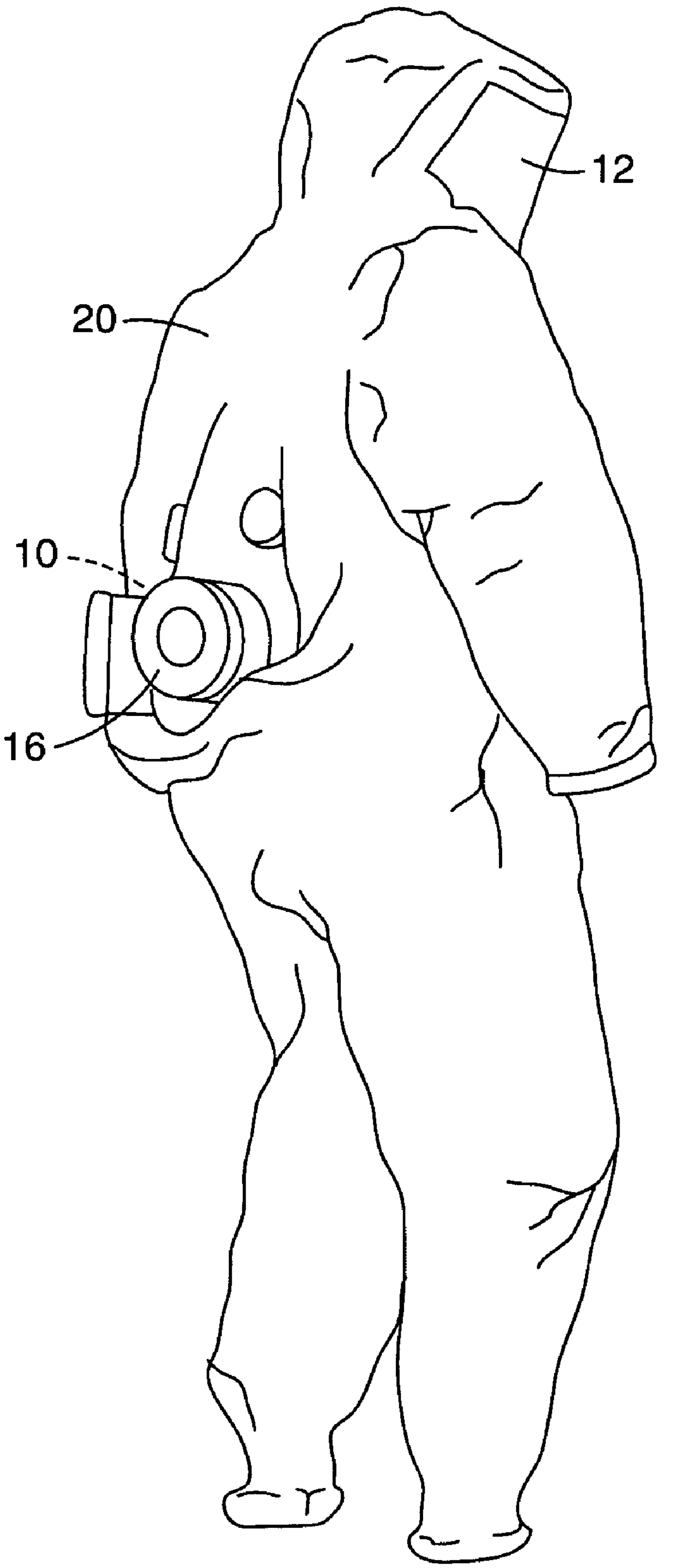
FIG. 2 is an external view of a PAPR constructed in accordance with an alternative embodiment of the present invention.

FIG. 2 illustrates an alternative embodiment of PAPR 10. Instead of utilizing air duct 18, as in FIG. 1, PAPR 10 including air duct 18 is mounted within body suit 20. PAPR 10 includes filter 16 as well as a fan or blower for creating a forced flow of air and an electrical power source for such fan or blower.

Again, PAPR 10 may be stored in an accessible location ready to be utilized by a user should the need for use arise. If a user were to encounter an environment desiring or requiring the forced supply filtered air, the user could select PAPR 10, including body suit 20, from storage, don body suit 20 incorporating PAPR 10 and use PAPR 10 in the desired environment.

PAPR 10 may be stored for a considerable period of time while awaiting its desired use by wearer 12. Although in storage, PAPR 10 may need to be operational for a user upon relatively short notice. That is, a user may not have advance notice of a requirement or desire to utilize PAPR 10.

Thus, it is desirable that PAPR 10 be not only storable for a considerable period of time but that PAPR 10 be reliably usable by a wearer within a relatively short period of time once use of PAPR 10 is desired and/or required.

A source of electrical power for PAPR 10 is a lithium battery. Lithium batteries can have a long shelf life, e.g., ten (10) years, making them useful for relatively long storage times while still maintaining a useful life once used.

Lithium primary batteries commonly are subject to a chemical reaction known as passivation. Passivation of the battery occurs, on the lithium metal surface, when a reaction between the lithium metal anode and the cathode takes place. The passivation layer serves to protect the battery from internal discharge in storage. The high resistance passivation layer between the electrodes of the battery is a primary reason for the long shelf life of lithium cells.

Figure 3:
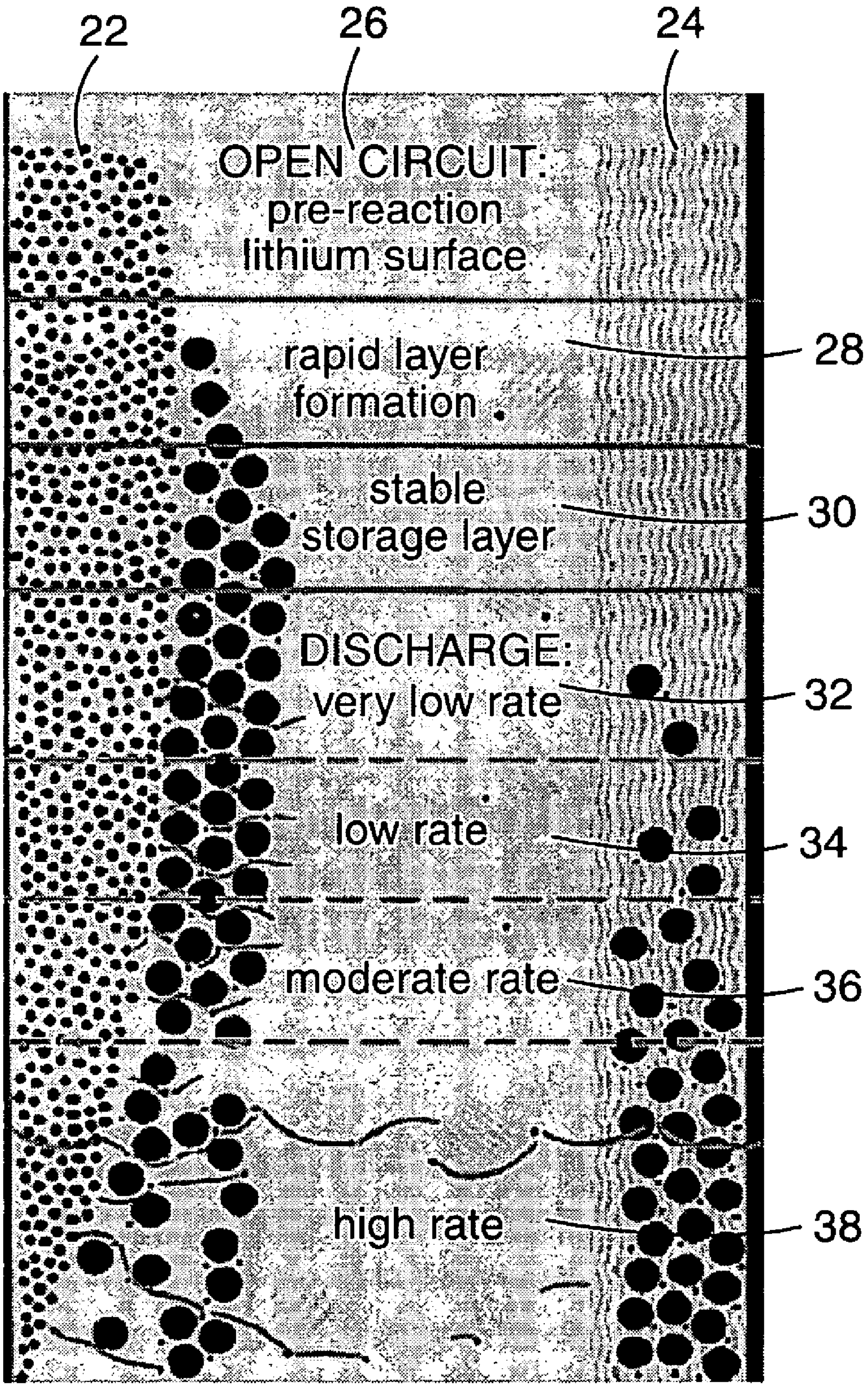
FIG. 3 is a schematic illustration of passivation/depassivation dynamics in a lithium primary cell.

FIG. 3 illustrates the dynamics involved in passivation and depassivation of such a resistance layer in a typical lithium primary cell. In general, the diagram illustrated in FIG. 3 is represented by anode 22 and cathode support 24 dispersed in an electrolyte. Section 26 of the diagram is representative of an open circuit condition of the cell showing the instant addition of a cathode containing electrolyte before a passivation reaction occurs. Such a condition could be indicative of a newly formed cell. Section 28 of the diagram illustrates the relatively rapid formation of a passivation layer on anode 22 during non-use of the cell. Section 30 of the diagram illustrates a stable formation of a passivation (resistance) layer on anode 22 of the battery cell during a relatively long period of non-use. Section 32 of the diagram illustrates a small disturbance of the passivation layer when a small load is applied to the cell. When a larger load is applied, a greater rate of depassivation is achieved (illustrated progressively by sections 34, 36 and 38 in the diagram).

Figure 4:
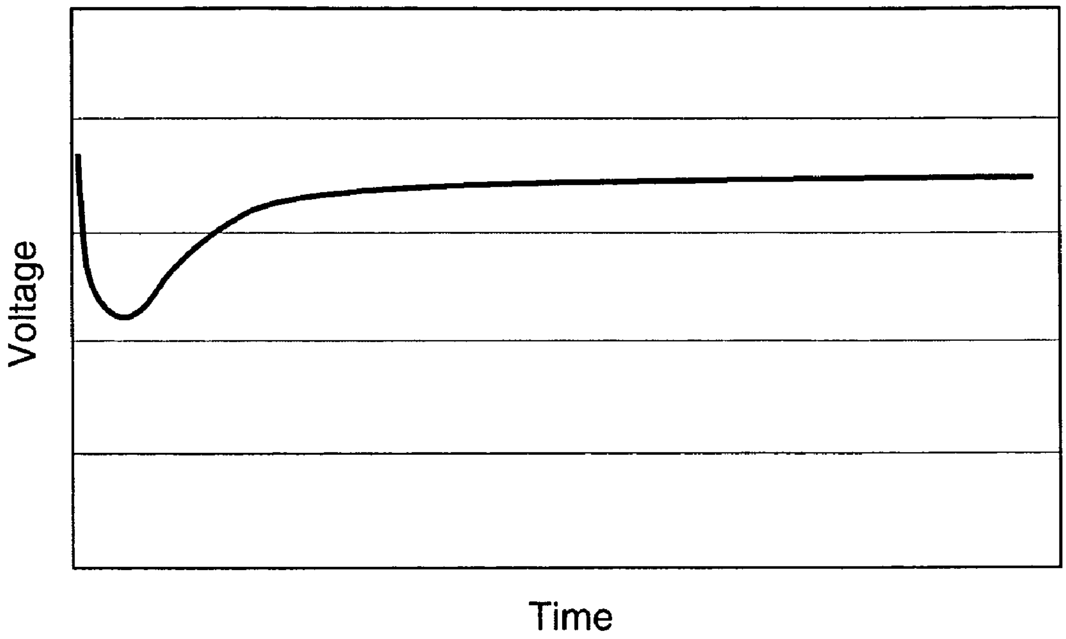
FIG. 4 is a graph showing a typical voltage delay curve as the result of passivation from a lithium battery cell.

FIG. 4 is a graph illustrating the effects of passivation upon the voltage available from a lithium battery having voltage delay characteristics due to passivation. When the lithium battery is initially utilized, the voltage available from the lithium battery can drop significantly due to passivation (existence of a resistance layer). The graph illustrates that the voltage available from the lithium battery drops. As cell depassivation occurs, the voltage available from the lithium primary battery gradually recovers to the original available potential.

The voltage delay could result in deleterious operation of the device since the available voltage from the lithium battery may not be available. In the case of PAPR 10, lack of available voltage may deleteriously reduce the function of the fan or blower in PAPR which may not provide the wearer with an adequate forced air supply. Further, lack of available voltage from the lithium battery may affect the entire operation of PAPR 10 if, for example, control circuitry contained in or supplied by PAPR 10 or from the lithium battery does obtain sufficient voltage to operate properly.

Several different factors may increase battery passivation thereby influencing the length and the depth of the voltage delay characteristic. High current loads on the passivated battery cell may cause the voltage delay characteristic to increase. Conversely, a voltage delay characteristic may be unnoticeable with very small current loads. Different chemical formulations may also influence the length and/or depth of passivation. Generally, the longer a battery cell has been storage, the more uniform and the concentrated the passivation layer that is formed on the anode of the battery cell.

A higher storage temperature generally increases the degree of passivation of a lithium battery. A higher storage temperature effectively shortens the time required to achieve a certain degree of passivation. Essentially, a battery cell stored for a relatively short period of time at a relative high temperature may achieve a similar degree of passivation as a battery cell stored for a relatively long period of time at a relatively lower temperature.

After a load is placed on a battery cell that has experienced passivation, the high resistance of the passivation layer causes the voltage of the battery cell to decrease, or dip. The discharge reaction of the battery cell being used slowly removes the passivation layer thereby lowering the internal resistance of the battery cell. This in turn causes the voltage of the battery cell to reach a peak value which could remain relatively stable in the relatively short term if other discharge conditions do not markedly change. If, however, the current load on the battery cell increases after the voltage of the battery cell stabilizes, the voltage may again decrease until the passivation layer is sufficiently removed, or broken down.

Once the load from the battery cell is removed, e.g., the battery is removed from service, the passivation layer may reform and voltage delay may again be a factor when a subsequent load is applied to the battery cell.

In order to control the passivation of a power source exhibiting a voltage delay characteristic, such as described above with respect to a battery having a lithium type battery cell, it may be desirable, in an embodiment of the invention, to limit the amount of current drawn from the battery at the initial stages of battery use. Thus, the voltage drop from the battery is minimized and the voltage available from the battery can be maintained at a level such that PAPR 10 can still function. While full capacity of PAPR 10 may not be initially available due to the limitation on current draw, the effect of passivation can be minimized and the time required to depassivate the battery may be shortened. This would allow full capacity of PAPR 10 to be achieved more quickly than would otherwise occur.

In an embodiment, it may be desirable and important to notify the user of PAPR 10 that full capacity of PAPR 10 may not be available during the period in which passivation occurs or in which depassivation is occurring. Signaling the user, who may also be the wearer of PAPR 10, may indicate that passivation of the power supply powering PAPR 10 may prevent PAPR 10 from delivering full functionality, e.g., full capacity. Alternatively, PAPR 10 may signal the user when PAPR 10 has been sufficiently depassivated to be available for use in suitable environments.

Figure 5:
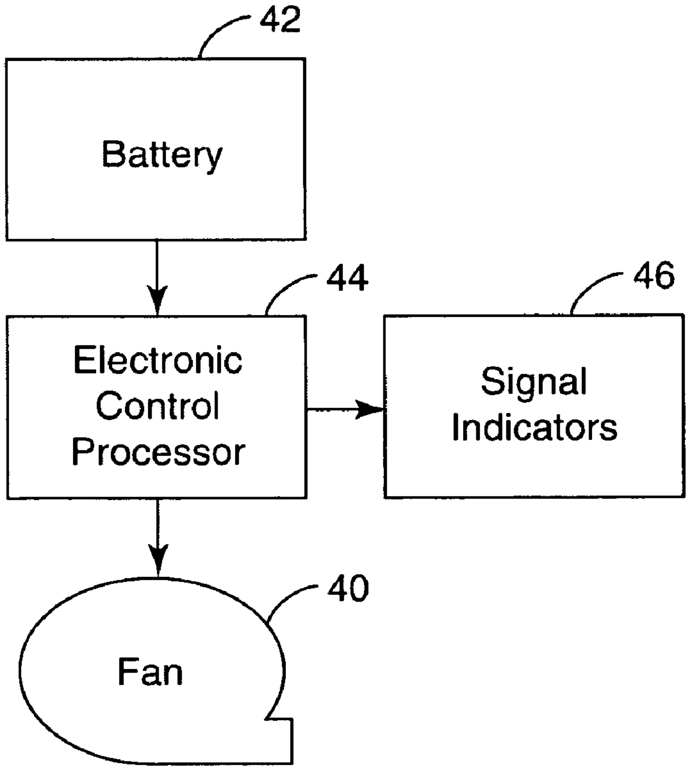
FIG. 5 is a block diagram of an air respirator constructed in accordance with embodiments of the present invention.

FIG. 5 is a block diagram of PAPR 10 incorporating embodiments of the present invention. PAPR 10 contains fan, or blower, 40 for providing a forced flow of air in air duct 18 (not shown in FIG. 5). Fan 40 is powered by battery 42 providing a source of electrical power. Battery 42 may exhibit a voltage delay characteristic in certain operating situations and may be a lithium battery exhibiting passivation.

Electronic control processor 44 is operatively coupled to battery 42. A sensor portion of electronic control processor 44 detects a voltage delay characteristic, typically passivation, of battery 42. In an embodiment, sensor portion of electronic control processor 44 detects voltage by monitoring the voltage available from battery 42. Upon activation of PAPR 10 and, hence, utilization of battery 42, sensor portion of electronic control processor 44 monitors the voltage available from battery 42. If the voltage available from battery 42 drops to or below a threshold level, sensor portion of electronic control processor 44 is able to maintain power to electronic control processor 44 at the threshold level ("Vbat" min in FIG. 6).

Electronic control processor 44 could activate signal 46 to alert a user, such as wearer 12, that PAPR 10 may not be able to operate at full capacity while depassivation of battery 42 occurs. Signal 46 may be any type of signaling device that can alert a user. Examples of signaling devices include, but are not limited to, visual signals, aural signals or any other type of signal. Visual signals could be a light or lights, or text displays, for example. Aural signals could be a bell or bells, a chime or chimes, a tone or tones, a buzz or buzzes, for examples, or any combination of aural signals. It is also contemplated that combinations of signals could also be utilized, for example a combination using both visual and aural signals.

Further, signal 46 could be constructed to provide any sort of an intermediary signal, such as an electronic signal or computer signal, digital or analog, which could, for example be transmitted or otherwise communicated to another device, such as a computer, perhaps located at a remote site, which device could then alert a user by any of the signaling techniques described above or any other signaling technique.

Signal 46 may be employed to alert a user as to the existence of a voltage delay characteristic in battery 42. As such the signal may indicate that the user should not wear or rely on PAPR 10 in selected environments unless or until the signal diminishes or is removed. Signal 42 may alternatively be employed to alert a user that depassivation has proceeded to break down the passivation of battery 42 such that air respirator may be operable in selected environments or all environments. As such the signal may indicate to the user that PAPR 10 is ready for use and if the signal is not available that the respirator perhaps should not be used in selected environments.

Signal 46 may be a binary representation. That is, signal 46 may indicate simply that a voltage delay characteristic exists or that a voltage delay characteristic does not exist. It is also contemplated that signal 46 may represent a degree of passivation or a degree to which a voltage delay characteristic exists. Such signal may represent a value or level, such as by a brightness of light, number of lights, level of auditory signal, and/or number or type of auditory tones, as examples. Signal 46 indicative of a voltage delay characteristic level could be used by the user or the wearer to determine at what level to use PAPR 10 or in which environments use of air respirator, at that functioning level, would be appropriate. Further, signal 46 may be indicative of an amount of time remaining, or estimated to be remaining, until PAPR 10 achieves a depassivation and/or performance milestone, such as when PAPR 10 is suitable for a predetermined use, or indicative of a period of time related to such time remaining.

It is to be recognized and understood that many other types of signals are available and contemplated from signal 46.

In an embodiment, PAPR 10 may also contain correction circuitry. Such correction circuitry may be contained as a portion of electronic control processor 44. Correction circuitry may operate responsive to sensor portion of electronic control processor 44 or independent of sensor portion of electronic control processor 44 to more efficiently overcome the effects of passivation, i.e., overcome the voltage delay effect, of battery 42 than would otherwise be the case without such correction circuitry. In an embodiment, correction circuitry operates to limit an amount of current drawn from battery 42 during initial use and/or during depassivation to mitigate depassivation of battery 42. As noted above, the effect of passivation of a lithium battery may be mitigated, i.e., the voltage drop effect of passivation may be reduced or lessoned, if the current draw from battery 42 is limited.

In an embodiment, such correction circuitry may operate by employing an active or a passive current limiter. An example of correction circuitry would be a plurality of resistive elements which could be switched in or out of the supply of battery 42 to effectively limit the current drawn from battery 42.

Correction circuitry portion of electronic control processor 44 may operate in conjunction with, or responsive to, sensor portion of electronic control processor 44. For example, if sensor portion of electronic control processor 44 detects a voltage delay characteristic, then correction circuitry may be activated to limit current drawn from battery 42. Once sensor portion of electronic control processor 44 indicates that a voltage delay condition no longer exists, then correction circuitry portion of electronic control processor 44 may be withdrawn. Degrees of voltage delay characteristic may invoke varying degrees of activation of correction circuitry, e.g., by a varying amount of current limitation.

In another embodiment, correction circuitry portion of electronic control processor 44 may be utilized independent of sensor portion of electronic control processor 44. With certain types of battery 42, correction circuitry portion of electronic control processor 44 may be utilized whenever battery 42 is initially utilized, e.g., when PAPR 10 is turned on, to limit the current drawn from battery 42 for a predetermined period of time or in various amount or to various degrees for a period or periods of time. In this way, PAPR 10 could ensure proper operation by automatically correcting for a voltage delay characteristic when air respirator is activated.

Figure 6:
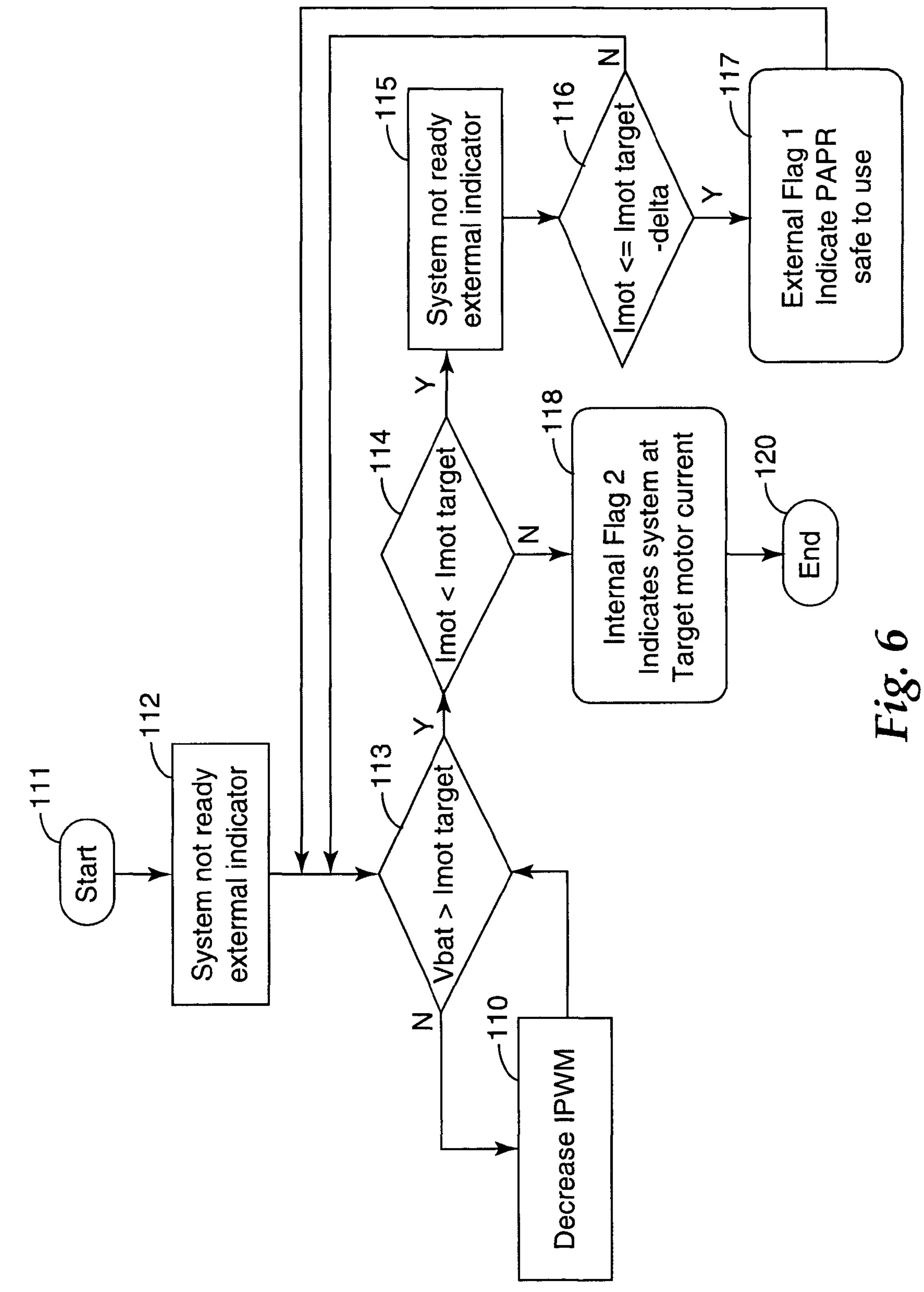
FIG. 6 is a flow chart incorporating elements of various embodiments of the present invention.

FIG. 6 illustrates a flow chart embodying various aspects of embodiments of the present invention. A battery 42 is inserted (110) into PAPR 10. Immediate notice is provided (112) to a user that PAPR 10 is not ready for use. Electronic control processor 44 then detects (113) the voltage of battery 42 which on start-up is likely to be greater that the predetermined minimum level for the voltage of battery 42. Electronic control processor 44 then checks (114) the current drawn by fan 40, which on start-up should be less than the target current. Electronic control processor 44 increases (115) the current pulse width modulation to fan 40. Electronic control processor 44 then checks (116) drawn by fan 40 again and calculates whether a safe to use flag can be displayed (117) or a loop back to battery voltage detection (113) should be conducted. As the current to fan 40 is increased again (115), the battery voltage may fall below the predetermined minimum battery voltage (113) due to passivation. The pulse width modulation of current drawn by fan 40 is decreased (119). The process loops between a voltage check (113) and increases in pulse width modulation (119), if required, until voltage of battery 42 is greater than the minimum battery voltage. The process continues to increase the pulse width modulation of current drawn by battery 42 through loops (113, 114, 115, 116 and 113) or (113, 119 and 113) as determined by the sensing and control electronics in electronic control processor 44. When the current drawn by fan 40 is no longer less than the fan target current (114), an internal flag is activated (118) and the user may be notified that depassivation has sufficiently processed so that PAPR 10 may be used and the passivation detection and depassivation control process is ended (120). Of course, it is to be recognized and understood that additional process controls related to the operation of PAPR 10 that are not related to passivation or depassivation may then be performed.

In an embodiment, correction of voltage delay characteristic may be elimination, or perceptible elimination, of a voltage delay characteristic, i.e., returning battery 42 as near as reasonably possible back to a condition in which battery 42 is not passivated. In an embodiment, correction of voltage delay characteristic may be the elimination of a certain degree of passivation or the break down of a certain level of resistance layer. As an example, the user may be notified once a certain percentage of passivation of battery 42 has been eliminated, such as ninety percent (90%) of passivation, either previously existing or potentially achievable, has been eliminated. In an embodiment, the user may be notified when air respirator may be operated normally, i.e., within normal operating specifications. In an embodiment, the user may be notified when a predetermined or specified minimum air flow level is achievable by PAPR 10. It is to be recognized and understood that in all instances, when notification is discussed, such notification contemplate either notification upon achievement or cessation of notification of passivation or both.

It is also to be recognized and understood that signal 46 may be utilized to notify a user while depassivation is still occurring. It may be possible, in some circumstances, to notify a user that it is safe or permissible to operate PAPR 10 when only a portion of the effects of passivation have been overcome. For example, a user may be notified when a predetermined percentage of depassivation has been achieved, e.g., ninety percent (90%). This degree of depassivation may allow PAPR 10 to be operated satisfactorily or for certain uses or in certain circumstances even though full depassivation has not yet been achieved. In this case, depassivation may continue to be overcome even though a user has been notified concerning passivation or operation of PAPR 10. As in other cases of notification of a user or signaling of a user, the user may either be notified of the existence of passivation, i.e., PAPR 10 is not or may not be fully situational operative, or the notification may be that depassivation has fully or partially been completed, i.e., PAPR 10 is or may be partially or full situational operative.

Throughout this description, voltage delay characteristic has been described in relation to passivation of lithium batteries. It is to be recognized and understood that the present invention may be equally applicable to other types of power supplies which exhibit voltage delay characteristics even though passivation may not occur or the power source may not be lithium related.

Thus, embodiments of the invention are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A powered air purifying respirator capable of directing a forced flow of air to a wearer, comprising:

a member having an air flow path for said forced flow of air;

a fan, fluidly coupled with said air flow path, creating said forced flow of air;

a filter disposed in said air flow path;

a battery, operatively powering said fan, exhibiting, in some circumstances, passivation;

an electronic control processor including at least a voltage delay sensing circuit and a correction circuit; and a signal, operatively coupled to said voltage delay sensing circuit, providing a first indication to a user of said passivation of said battery;

wherein the voltage delay sensing circuit is operatively coupled to the battery and the correction circuit is operatively coupled to said voltage delay sensing circuit and to said battery, overcoming said passivation of said battery responsive to said voltage delay sensing circuit by limiting current drawn from said battery;

wherein the signal further provides a second indication to the user based on a current level available from said battery when the powered air purifying respirator achieves a minimum flow rate of said forced flow of air.

2. A powered air purifying respirator as in claim 1 wherein said voltage delay sensing circuit detects voltage delay caused by said passivation by sensing a voltage drop from said battery.

3. A powered air purifying respirator as in claim 1 wherein said correction circuit corrects said passivation of said battery by limiting current drawn from said battery until an insulative layer created as a result of said passivation of said battery is broken down sufficiently to allow said air respiration device to provide suitable operation for said wearer.

4. A powered air purifying respirator as in claim 1 wherein said battery has a voltage and wherein said correction circuit prevents said voltage from dropping below a predetermined value.

5. A powered air purifying respirator as in claim 4 wherein said voltage is prevented from dropping below said predetermined value by limiting current drawn from said battery.

6. A powered air purifying respirator as in claim 5 wherein said correction circuit subsequently allows a greater amount of current to be drawn from said battery as said passivation of said battery diminishes.

7. A powered air purifying respirator as in claim 1 wherein the second indication is provided as a function of a normal current draw is achieved from said battery when said voltage is maintained at least at a predetermined voltage.

8. A powered air purifying respirator as in claim 1 wherein the second indication is provided when normal current draw is achieved from said battery when said voltage is maintained at least at said predetermined voltage.

9. A powered air purifying respirator as in claim 1 wherein the first indication is related, at least in part, to said recognition of passivation of said battery.

10. A powered air purifying respirator as in claim 9 wherein said voltage delay sensing circuit detects voltage delay caused by said passivation by sensing a voltage drop from said battery.

11. A method of operating a powered air purifying respirator capable of directing a forced flow of air to a wearer having a member having an air flow path for said forced flow of air, a filter disposed in said forced flow of air, a fan, fluidly coupled with said air flow path, creating said forced flow of air; a battery, operatively powering said fan, exhibiting, in some circumstances, passivation; and an electronic control processor, operatively coupled to said battery, comprising the steps of:

sensing said passivation of said battery;

providing a first indication to a user of a degree of said passivation of said battery; overcoming said passivation of said battery responsive to said sensing of said passivation; and providing a second indication based on a current level available from said battery to the user when the powered air purifying respirator achieves a minimum flow rate of said forced flow of air.

12. A method as in claim 11 further comprising the step of indicating correction of said passivation.

13. A method as in claim 11 wherein said sensing step detects voltage delay caused by said passivation by sensing a voltage drop from said battery.

14. A method as in claim 11 wherein said overcoming step corrects said passivation of said battery responsive to the first indication.

15. A method as in claim 11 wherein said overcoming step limits current drawn from said battery.

16. A method as in claim 15 wherein said current drawn from said battery is limited until an insulative layer created as a result of said passivation of said battery is broken down sufficiently to allow said air respiration device to provide suitable operation for said wearer.

17. A method as in claim 15 wherein said battery has a voltage and wherein said overcoming step prevents said voltage from dropping below a predetermined value.

18. A method as in claim 17 wherein said voltage is prevented from dropping below said predetermined value by limiting current drawn from said battery.

19. A method as in claim 18 wherein said overcoming step subsequently raises current drawn from said battery as said passivation of said battery is corrected.

20. A method as in claim 11 wherein the second indication is provided as a function of a normal current draw is achieved from said battery when said voltage is maintained at least at a predetermined voltage.

21. A method as in claim 20 wherein the second indication is provided when normal current draw is achieved from said battery when said voltage is maintained at least at said predetermined voltage.

22. The powered air purifying respirator of claim 1, wherein the signal provides an indication to the user that the system is not ready due to said passivation of said battery.

23. The powered air purifying respirator of claim 1, further comprising a second signal, wherein the second signal provides an indication to the user that the respirator is safe to use.

24. The powered air purifying respirator of claim 1, wherein the powered air purifying respirator transmits a second signal to a device at a remote location providing an indication of said passivation of said battery.

25. The method of claim 11, further comprising transmitting a signal to a device at a remote location providing an indication to a said passivation of said battery.

26. The powered air purifying respirator of claim 1, further comprising a signal related to a period of time remaining until the powered air purifying respirator achieves a performance milestone.

27. The method of claim 11, further comprising providing a signal related to a period of time remaining until the powered air purifying respirator achieves a performance milestone.

* * * * *